United States Patent [19]

Otowa et al.

[11] Patent Number: 5,080,421
[45] Date of Patent: Jan. 14, 1992

[54] APPARATUS FOR PREVENTING DISCHARGE OF FUEL VAPOR

[75] Inventors: Hidekazu Otowa; Kazuhiro Okada; Hidefumi Sonoda; Tadao Kaneko; Kazuhisa Sawada, all of Aichi, Japan

[73] Assignee: Toyota Jidosha Kabushiki Kaisha, Toyota, Japan

[21] Appl. No.: 496,995

[22] Filed: Mar. 21, 1990

[30] Foreign Application Priority Data

Mar. 22, 1989 [JP] Japan ................................ 1-32195[U]
Apr. 11, 1989 [JP] Japan ................................ 1-42168[U]

[51] Int. Cl.[5] ............................................. B62D 25/00
[52] U.S. Cl. .................................... 296/97.22; 55/387; 123/519
[58] Field of Search ...................... 55/387; 296/97.22; 123/519

[56] References Cited

U.S. PATENT DOCUMENTS 4,659,346  4/1987  Uranishi et al. .................. 296/97.22
4,872,439  10/1989  Sonoda et al. ........................ 123/518

Primary Examiner—Bernard Nozick
Attorney, Agent, or Firm—Finnegan, Henderson, Farabow, Garrett and Dunner

[57] ABSTRACT

An apparatus for preventing discharge of fuel vapor to the atmosphere by allowing fuel vapor in a fuel tank to be adsorbed by an adsorbing device when a fuel lid is opened. A switch is turned on by the movement of a locking member for locking and unlocking the fuel lid so as to detect the opening of the fuel lid. The arrangement facilitates adjustment of the relative positions of the switch and the locking member. In addition, the switch is turned on when the fuel lid is opened by remote control, while the switch is turned off when the fuel lid is manually closed. The discharge of fuel vapor to the atmosphere during refueling and the influx of fuel vapor into the adsorbing device after the charging of fuel are prevented.

6 Claims, 13 Drawing Sheets

APPARATUS FOR PREVENTING DISCHARGE OF FUEL VAPOR

BACKGROUND OF THE INVENTION

1. Field of the Invention

The present invention relates to an apparatus for preventing discharge of fuel vapor; and more particularly, to an apparatus for preventing such discharge from a vehicle fuel tank which is made to communicate with a charcoal canister via a vent tube at times when a fuel lid is opened by a fuel lid opener, for causing and fuel vapor to be adsorbed by the charcoal canister.

2. Description of the Related Art

A conventional apparatus for preventing discharge of fuel vapor from a vehicle fuel tank to the atmosphere when the fuel tank is being filled is disclosed in Japanese Patent Laid-Open No. 41244/1988.

This apparatus has a vent tube connecting the fuel tank to a charcoal canister for adsorbing fuel vapor. A solenoid valve which is disposed midway in the vent tube is normally closed when fuel lid is closed (locked state). A switch detects the actuation of the fuel lid opener and opens the solenoid valve.

Accordingly, at the time of refueling, if the locked fuel lid is operated to the unlocked state, an actuation detecting switch is turned on, which, in turn, causes the solenoid valve in the vent tube to open, thereby allowing fuel vapor in the fuel tank to flow into the charcoal canister via the vent tube for adsorption by the charcoal in the canister. As a result, it is possible to prevent the fuel vapor from being discharged via the inlet pipe (filler pipe) to the atmosphere during refueling.

This prior apparatus for preventing discharge of fuel vapor, uses an actuation detecting switch as shown in FIG. 13, wherein an actuation detecting switch 90 is disposed midway in a wire tube 92 covering a wire 94, which connects a lid opener lever to a fuel lid locking device. The opening and closing of actuation detecting switch 90 is controlled by an actuator 96 fixed to the movable wire 94.

Accordingly, after a fuel lid locking device is mounted to an automobile body, it is necessary to adjust the position of the wire tube 92 relative to the wire 94 so as to determine the relative position of the actuation detecting switch 90 and the actuator 96. This complicates the position adjusting operation, and decreases the efficiency assembly. In addition, even the fixing of a magnet to the wire and a lead switch to the wire tube does not make the adjusting operation any less complicated than the one described above.

In addition, since the actuator 96 is fixed to the wire 94, and the wire 94 is returned to its original position by the spring loaded automatic return of the lid opener lever, detecting switch or the lead switch is also opened, which in turn closes the solenoid valve. This causes a problem in that fuel vapor escapes through the inlet pipe during refueling. To solve this problem, Japanese Patent Laid-Open No. 53224/1987, proposed that the solenoid valve be held in the open state by a self-holding or stick circuit from the time that the fuel lid is opened until the vehicle is started. However, since the solenoid valve is electrically held open by the stick circuit, there is the possibility that the stick circuit may malfunction due to variations in voltage noise or the like, in which case the solenoid valve would close during refueling, causing the fuel vapor to be discharged to the atmosphere through the inlet pipe.

Of course, after refueling, it is necessary to close the solenoid valve to ensure that the fuel vapor will not escape from the fuel tank. However the above-described stick circuit device does not permit the solenoid valve to close unless the vehicle is started. Thus, if the vehicle is not started, the solenoid valve remains in the open state, permitting the fuel vapor in the fuel tank to flow into the charcoal canister after the lid is replaced on the inlet pipe of the tank.

SUMMARY OF THE INVENTION

Accordingly, an object of the present invention is to provide an apparatus for preventing discharge of fuel vapor which overcomes the above described deficiencies by decreasing the difficulty of adjusting the position of an actuation detecting switch for detecting the unlocking of a fuel lid.

To attain the above-described object, and in accordance with one aspect of the invention, there is provided an apparatus for preventing discharge of fuel vapor from a fuel tank comprising: adsorbing means for adsorbing fuel vapor; means for communicating between the adsorbing means and the fuel tank; lid locking means movable reciprocatably between a locking position for-holding a fuel lid in a closed state and an unlocking position for releasing the fuel lid to an open state; lid opening means for moving the locking means by remote control; switching means response to the movement of the lid locking means from the locking position to unlocking position; and lid opening means for closing the communicating means at times when the lid locking means is located in the locking position and for opening the communicating means in interlocking relation with the operation of the switching means.

In accordance with this aspect of the invention, at times when the lid locking means is moved from the locking position to the unlocking position by the lid opening means, the closed fuel lid is released, and, at the same time, the switching means is actuated. The communicating means is opened in interlocking relationship with the actuation of the switching means, thereby allowing the adsorbing means and the fuel tank to communicate with each other. Accordingly, the fuel vapor in the fuel tank flows into and is adsorbed by the adsorbing means via the communicating means. When the lid locking means is in the locking position, the communicating means is closed, so that the fuel vapor in the fuel tank is prevented from flowing into the adsorbing means.

As described above, and in accordance with the above-described aspect of the invention, since the switching means is actuated by the lid locking means, it is advantageous in that the switching means is actuated simply by determining the relative position of the lid locking means and the switching means; thereby improving the efficiency of position adjustment.

In addition, with the lid locking means and the switching means fixedly mounted to the supporting means before the supporting means is attached to the vehicle body, the efficiency of position adjustment can be further improved.

Another object of the present invention is to provide an apparatus for preventing discharge of fuel vapor wherein a solenoid valve is opened and closed in response to the opening and closing of a fuel lid to ensure that fuel vapor will not flow out from a fuel tank to the atmosphere during refueling and will not flow into charcoal canister after refueling.

To this end, and in accordance with another aspect of the invention, there is provided an apparatus for preventing discharge of fuel vapor, comprising: adsorbing means for adsorbing fuel vapor; communicating means for communication between the adsorbing means and a fuel tank; lid locking means movable reciprocatably between a locking position for holding a fuel lid in a closed state and an unlocking position for releasing the fuel lid; to an open state lid opening or operating means for moving by remote control the lid locking means from the locking position to the unlocking position; moving means for moving the lid locking means between the unlocking position and the locking position upon the closing of the fuel lid; switching means operated when the lid locking means is moved by the lid opening means from the locking position to the unlocking position, and is reset when the lid locking means is moved by the moving means between the locking position and the unlocking position; and valve means for opening the communicating means at times when the switching means is operated, and for closing the communicating means at times when the switching means is reset.

In accordance with the above aspect of the invention, when the lid locking means is moved by the lid opening means from the locking position to the unlocking position, the fuel lid in the closed state is released and the switching means is actuated. Upon actuation of the switching means, the adsorbing means and the fuel tank are made to communicate with each other, so that the fuel vapor in the fuel tank flows into and is adsorbed by the adsorbing means via the communicating means.

The moving means moves the lid locking means as the fuel lid is closed. When the lid locking means is moved by the moving means from the locking position to the unlocking position, the switching means is reset. Upon resetting of the switching means, the communicating means is closed, so that the fuel vapor in the fuel tank is prevented from flowing into the adsorbing means.

As described above, in accordance with the invention, the adsorbing means is made to communicate with the fuel tank when the fuel lid is opened, i.e., during refueling; and communication between the adsorbing means and the fuel tank is shut off when the fuel lid is closed, i.e., after refueling. Hence, it is possible to advantageously prevent the discharge of fuel vapor during refueling, and the efflux thereof to the adsorbing means is prevented after refueling.

Additional objects and advantages of the invention will be set forth and in part will be obvious from the description, or may be learned by practice of the invention. The objects and advantages of the invention may be realized and attained by means of the instrumentation and combination particularly pointed out in the appended claims.

BRIEF DESCRIPTION OF THE DRAWINGS

The accompanying drawings, which are incorporated in and constitute a part of this specification, illustrate two embodiments of the present invention and together with the description, serve to explain the principles of the present invention.

DESCRIPTION OF THE PREFERRED EMBODIMENTS

Referring now to FIGS. 1-5, description will be given of a first embodiment of the present invention:

As used herein unless otherwise stated and in order to simplify the detailed description and orientation of the various elements, the terms "longitudinal" or "longitudinally" refer generally to the lengthwise direction or plane and the terms "transverse" or "transversely" refers generally to the width direction or plane of the vehicle on which the apparatus is mounted. Similarly, the terms "front," "rear," "upper," and "lower" refer to the corresponding parts of the vehicle relative the mounted apparatus.

Figure 3:
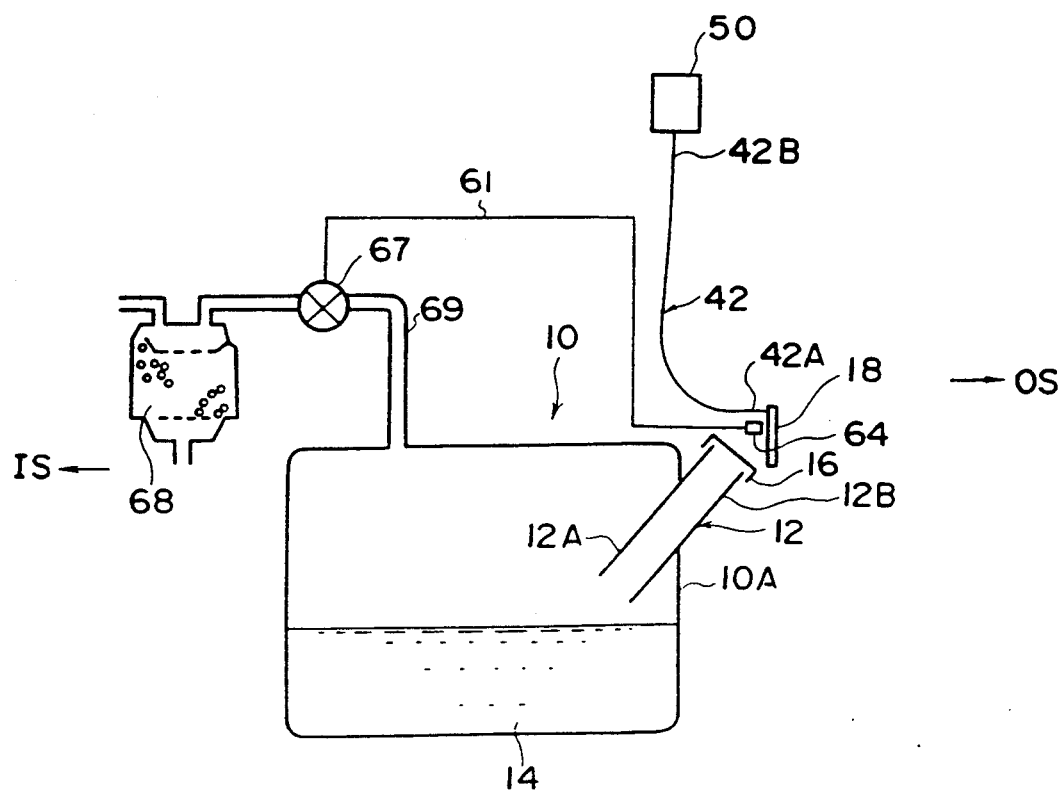
FIG. 3 is a diagram schematically illustrating a vapor recovery system utilizing the fuel lid lockign apparatus and an actuation detecting switch in accordance of the present invention.

As shown in FIG. 3, a lower end 12A of an inlet pipe (i.e., a filler pipe) 12 passes through an outer wall 10A, as-viewed in a transverse direction of a fuel tank 10 mounted on the vehicle. Fuel 14 is contained inside the fuel tank 10.

Figure 1:
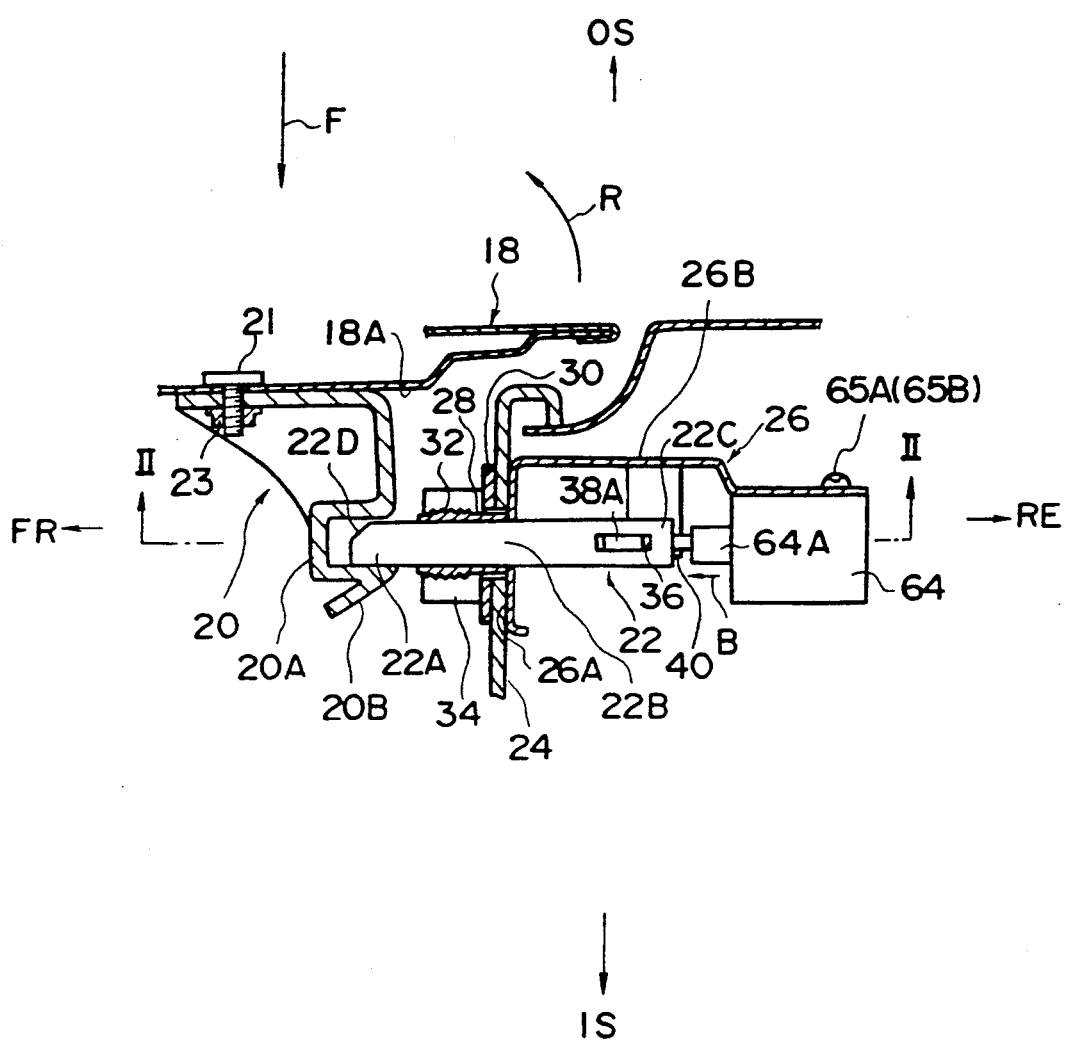
FIG. 1 is a fragmentary view partly in sectional view of a fuel lid locking apparatus with an actuation detecting switch in accordance with a first embodiment of the present invention.

An upper end of the inlet pipe 12 serves as a fuel inlet port 12B on which a fuel cap 16 is threadingly engaged. A fuel lid 18 is attached to a portion of a vehicle body outwardly of the fuel cap 16, as viewed in the transverse direction. The fuel lid 18 is pivotally supported by the vehicle body; and is constantly, urged by an urging means (not shown) counterclockwise as shown in the direction of arrow of FIG. 1 i.e., in the direction in which it is opened. After fuel lid 18 is opened, if the fuel cap 16 is removed from the fuel inlet port 12, and a fuel nozzle is inserted into the fuel inlet port 12B, fuel 14 can be supplied to the fuel tank 10. In FIG. 1, arrow F indicates the direction in which the fuel nozzle is inserted.

The present invention includes a lid locking means which moves in one direction to a locking position for holding a fuel lid in a closed position and in the opposite direction to an unlocking position for releasing the fuel lid. As embodied herein, and as shown in FIG. 1, the lid locking means includes a retainer 20 for holding the fuel lid 18 in a closed state which is secured to an inner side surface, as viewed in the transverse direction of the fuel lid 18 by means of a bolt 21 welded to the fuel lid in such a manner as to extend through the fuel lid 18 nut 23 is threaded on bolt 21.

A substantially U-shaped recess defined by bent hook portion 20A is formed in a transversely extending inner side of the lid retainer 20 with its open end facing rearwardly. In the locked state, one end 22A of a shaft 22 of the lid locking means is inserted into the recess defined by hook portion 20A from the rear.

Figure 2:
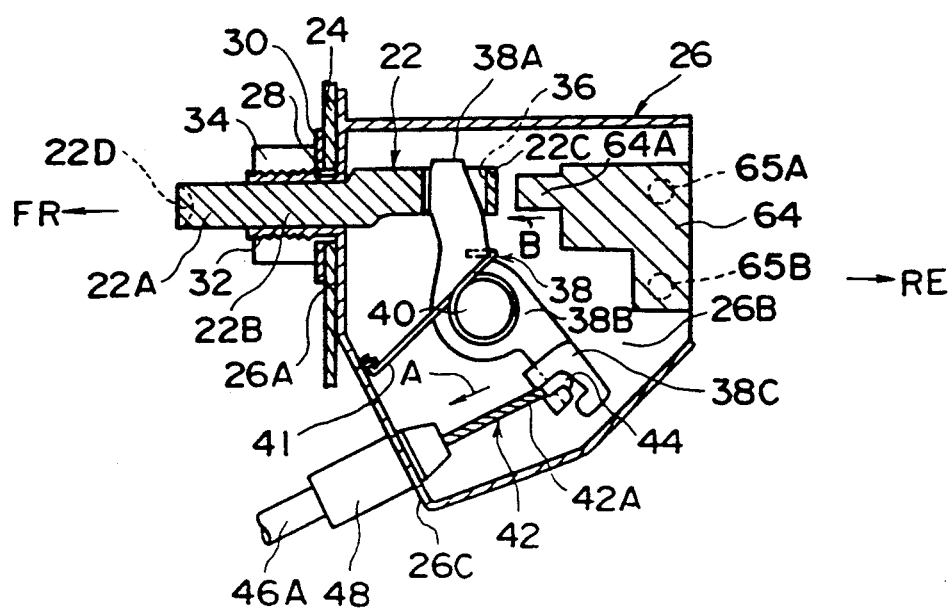
FIG. 2 is a cross-sectional view taken along the line II—II of FIG. 1 and additionally illustrating a portion of the lid opener.

As shown in FIGS. 1 and 2, the shaft 22 is secured by a shaft retainer or supporting housing 26, i.e., a support housing for the lid loading means in such a manner as to be movable in the longitudinal direction. Specifically, a central portion 22B of the shaft 22 is held in such a manner as to be inserted axially through a cylindrical member on bushing 28. The cylindrical bushing 28 extends longitudinally from front 26A of the shaft support housing 26 and projects perpendicular to the side 26A toward the front of the vehicle. Thus, the shaft 22 is movable axially in the longitudinal direction in the cylindrical bushing 28.

Housing 26 is fastened to vehicle frame member 24 with bushing 28 extending in a longitudinal direction through frame 24 of the vehicle body. A washer 30 is fitted over the cylindrical portion 28 from the front, and abuts the frame 24. An external thread 32 is formed on the cylindrical portion 28 forward of frame 24 and a nut 34 inserted from the front is threaded on external threads 32. In other words, the washer 30 and frame 24 are clamped between the nut 34 and the housing 26, thus securing housing 26 to the frame 24.

A rectangular through hole 36 extends vertically through shaft 22 adjacent the rear end portion 22C, a manner as to extend in the vertical direction of the vehicle (in the direction perpendicular to the plane of the lid opening means is provided for remotely controlling the operation of the lid locking means in interlocking relationship with the switching means. As embodied herein, lid opening means includes a lever 38 having one end 38A extending into hole 36 from beneath the shaft.

As shown in FIG. 2, a central portion 38B of the lever 38 is pivotally supported on a supporting pin 40 which is mounted on an outer wall 26B of support housing 26 and extends from the vertical surface 26B transversely inwardly of the housing 26. Consequently, the lever 38 is rotatable about the supporting pin 40 clockwise or counterclockwise as viewed in FIG. 2. In addition, the lever 38 is constantly urged counterclockwise as viewed in FIG. 2 by a torsion coil spring 41.

Thus, as lever 38 moves in either a clockwise or counter clockwise direction, the shaft 22 moves axially with it.

A hook portion 38C is formed at a lower end of the lever 38. A hook 44 fixed to one end 42A of a wire 42 is retained by the hook portion 38C. The wire 42 is inserted in a wire tube 46, and one end 46A of the wire tube 46 is secured to a lower wall 26C of the housing 26 via a tube stopper 48. As shown in FIG. 3, other end 42B of the wire 42 is connected to a lid opener 50 which is the remote portion of the lid opening means, and is provided in a vehicle compartment, for example.

Accordingly, if the lid opener 50 is operated to pull the wire 42 in the direction of arrow A of FIG. 2 against the urging force of the torsion coil spring 41, the lever 38 rotates about the support pin 40 clockwise as viewed in FIG. 2.

An actuation detecting switch 64 is mounted rearwardly in axial alignment with shaft 22 spaced a predetermined distance from the end of the shaft 22 when shaft 22 is in the locked position. In other words, the actuation detecting switch 64 is secured to the transverse surface 26B of the housing 26 by means of screws 65A, 65B. The diameter of each through hole provided in the wall 26B of housing 26 is formed to be slightly larger than the diameter of the shank of the screws 65A, 65B. Thus the mounting position of the actuation detecting switch 64 is adjustable in housing 26.

Switch 64 has a pushbutton 64A projecting longitudinally in alignment with actuation detecting switch 64 (in the direction of arrow B). Pushbutton 64A is depressed in the opposite direction to that of arrow B by engaging the end of the shaft 22 when the shaft 22 moves axially to the rear. The pushbutton 64A is constantly urged in the direction of arrow B by an urging means (not shown) provided in the actuation detecting switch 64. The arrangement is such that when the pushbutton 64A is moved in the opposite direction to that of arrow B against this urging force, the actuation detecting switch 64 is operated.

Figure 9:
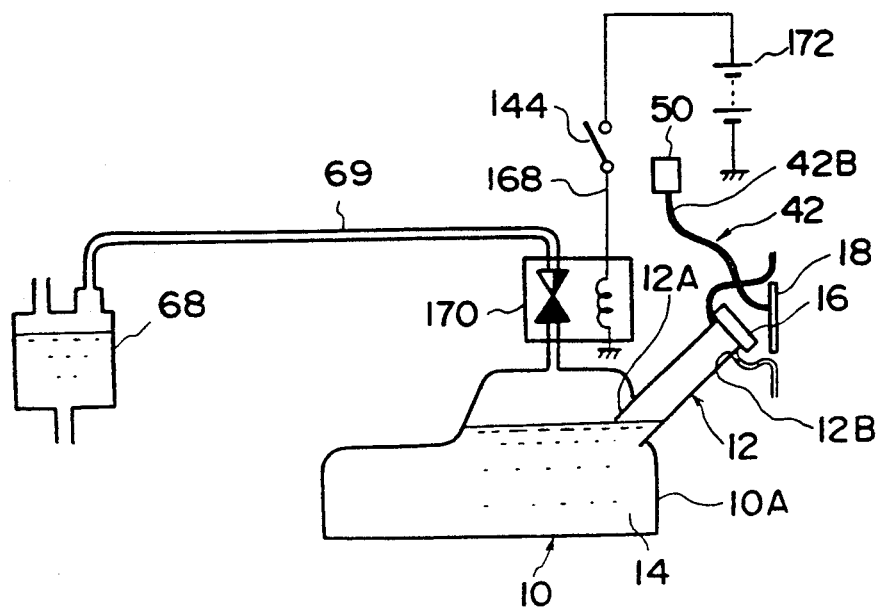
FIG. 9 is a diagram schematically illustrating a vapor recovery system using the apparatus in accordance with the second embodiment.

As shown schematically in FIG. 3, the actuation detecting switch 64 is connected to a coil of a solenoid valve 67 via an electrical wire 61. The connection of the coil of the solenoid valve 67 to a battery is illustrated in FIG. 9. The solenoid valve 67 is disposed midway in a vent tube 69 connecting the fuel tank 10 and a charcoal canister 68. When the actuation detecting switch 64 is open, the vent tube 69 is shut off by the solenoid valve 67, but when the actuation detecting switch 64 is closed, the coil is energized by a battery to open the solenoid valve, thereby putting the vent tube 69 in a communicating state.

As shown in FIG. 1, a chamfered or beveled portion 22D which slants from upper right toward lower left as viewed in FIG. 1 is formed at front end 22A of the shaft 22. A projection 20B having a surface inclined from upper right toward lower left as viewed in FIG. 1 substantially parallel to 22D is formed on the lower side, as viewed in FIG. 1, of the recess defined by hook portion 20A of the lid retainer 20.

Consequently, if the fuel lid 18 is closed in the opposite direction to that of arrow, R in FIG. 1, the inclined surface of the projection 20B is brought into contact with the inclined surface 22D, moving shaft 22 axially inwardly in housing 26 (right in FIG. 1) against the urging force of the coil spring 41. In addition, when the fuel lid 18 is closed, the end 22A of the shaft 22 advances into the recess defined by hook portion 20A by means of the urging force of the coil spring 41, thereby putting the fuel lid 18 in the locked state.

Figure 4:
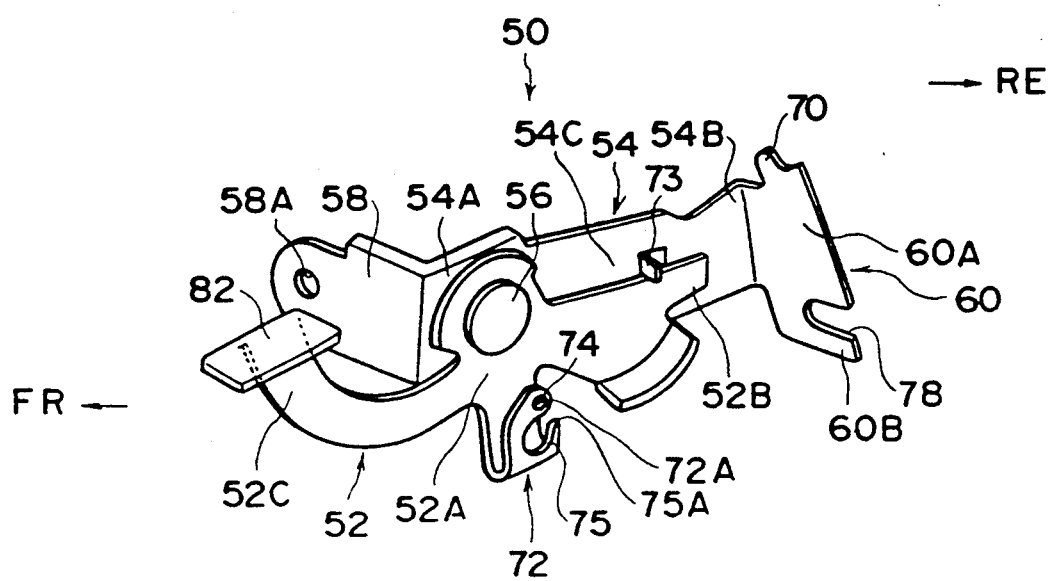
FIG. 4 is a perspective view of the remote portion of a fuel lid opener lever arrangement which is used in combination with the fuel lid locking apparatus and actuation detecting switch in accordance with the present invention.
Figure 5:
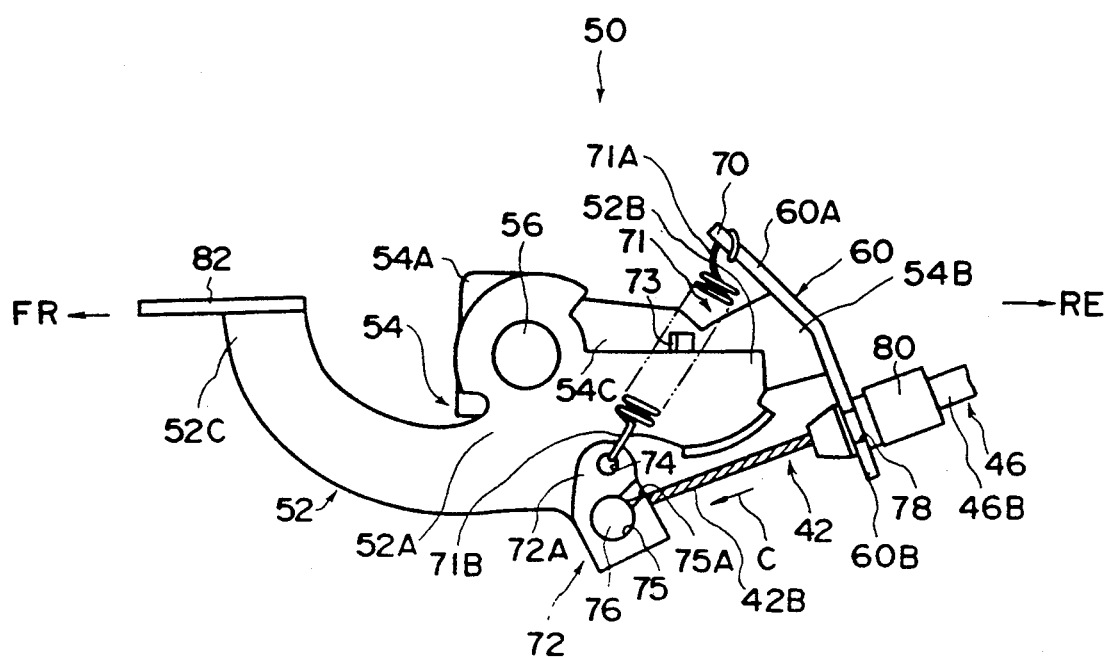
FIG. 5 is a side elevational view showing the remote portion of a fuel lid opener which is used with the fuel lid locking apparatus and actuation detecting switch in accordance with the present invention.

As shown in FIGS. 4 and 5, the remote lid opener portion 50 mainly comprises a lid opener lever 52 and a base plate 54.

The base plate 54 is formed of a tabular member, and its longitudinally extending front end portion (a left-hand end portion in FIG. 5) 54A is provided with a supporting pin 56 projecting transversely. A central portion 52A of the lid opener lever 52 is pivotally supported by the supporting pin 56 so that the lid opener lever 52 is rotatable about the supporting pin 56 clockwise or counterclockwise as viewed in FIG. 5.

In addition, a front end of the longitudinal front end portion 54A of the base plate 54 is bent orthogonally in a direction into the plane of the drawing of FIG. 5 so as to constitute a flange 58. The flange 58 is provided with a circular hole 58A. A bolt (not shown) is inserted in the circular hole 58A, for securing the base plate 54 inside the vehicle compartment.

Meanwhile, an end of transverse rear end portion (a right-hand end portion in FIG. 5) of the base plate 54 is bent orthogonally in a direction opposite portion 58 out of the plane of the paper of FIG. 5 so as to constitute a bent portion 60.

A hook 70 is formed at an upper extended portion 60A of the bent portion 60 of the base plate 54 in such a manner as to extend in the upper direction of the vehicle. As shown in FIG. 5, one hook 71A of a tension coil spring 71 is retained by the hook 70. The outer hook 71B of the tension coil spring 71 is retained at a circular hole 74 provided in a distal end 72A of a curved portion 72 which is formed in such a manner as to extend downwardly from the central portion 52A of the lid opener lever 52 and bend in a U-shaped configuration.

Consequently, the lid opener lever 52 is constantly urged counterclockwise in FIG. 5 by the tension of coil spring 71.

A pawl 73 is provided on a longitudinal central portion 54C of the base plate 54 in such a manner as to project transversely out of the plane of the paper of FIG. 5, and a portion adjacent to an end 52B of the lid opener lever 52 abuts the pawl 73 from therebelow. Accordingly, the counterclockwise rotation, as viewed in FIG. 5, of the lid opener lever 52 is prevented by the pawl 73.

A circular hole 75 with a notch 75A formed on the longitudinal front side thereof is provided on the lower side of the circular hole 74 in the lid opener lever 52. A cylindrical stopper 76 secured to one end 42B of the wire 42 is retained in the circular hole 75.

The other end 46B of the wire tube 46 is secured via a tube stopper 80 at a U-shaped notch 78 which is formed in a lower projection 60B of the bent portion 60 of the base plate 54 to open outwardly.

A longitudinal front end 52C of the lid opener lever 52 is bent horizontally to constitute a handle 82.

Accordingly, as an occupant pulls this handle 82 upwardly against the urging force of the tension coil spring 71, the lid opener lever 52 rotates clockwise as viewed in FIG. 5, which, in turn, causes the end 42B of the wire 42 to move in the direction of arrow of FIG. 5.

The operation of this embodiment will now be described.

When the occupant pulls up the handle 82 of the lid opener lever 52 against the urging force of the tension coil spring 71 at the time of refueling, the end 42B of the wire 42 moves in the direction of arrow C in FIG. 5. Consequently, the other end 42A of the wire 42 moves in the direction of arrow A in FIG. 2, causing the lever 38 to rotate clockwise in FIG. 2. Accordingly, the shaft 22 moves in the opposite direction to that of arrow B, and the end 22A of the shaft 22 is disengaged from the recess defined by hook portion 20A of the lid retainer 20, thereby allowing the fuel lid 18 to open in the direction of arrow R in FIG. 1.

Meanwhile, the end 22C of the shaft 22 abuts the pushbutton 64A of the actuation detecting switch 64 and moves the pushbutton 64A in the opposite direction to that of arrow B. Consequently, the actuation detecting switch 64 closes, and the solenoid valve 67 opens. As a result, the vent tube 69, for allowing the interior of the fuel tank 10 and the canister 68 to communicate with each other, is put in a communicating state, with the result that the fuel vapor is adsorbed by the canister 68, thereby preventing the fuel vapor from being discharged to the atmosphere.

In addition, the actuation detecting switch 64 and the shaft 22 are fixed to the shaft support housing 26. Accordingly, when the housing 26 is fabricated into a subassembly, it is possible to position the actuation detecting switch 64 and the shaft 22 in such a manner that the opening and closing of the actuation detecting switch 64 will be controlled positively. Accordingly, it is possible to improve the working efficinecy of the position adjusting task for the actuation detecting switch 64.

An outstanding advantage is obtained with the above described embodiment in that it is possible to improve the efficiency of adjusting the position of the actuation detecting switch for effecting control of the opening and closing of the solenoid valve for putting the vent tube in a communicating state and a noncommunicating state.

The second embodiment of the invention will be described with reference to FIGS. 6 through 12. Since FIGS. 6, 7, and 9 have elements common to FIGS. 2, 1, and 3, respectively, corresponding parts are denoted by the same reference numerals, and a description thereof will be omitted.

Figure 6:
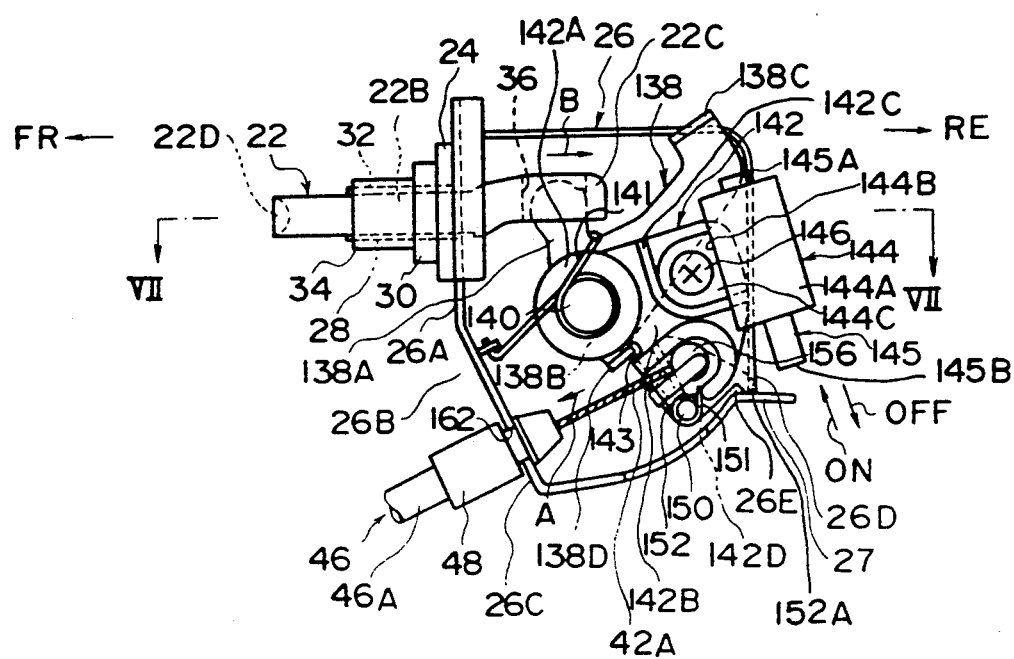
FIG. 6 is a fragmentary side elevational view of a fuel lid locking apparatus and switch in combination with a lid opener including an opening/closing detector in accordance with a second embodiment of the present invention.
Figure 7:
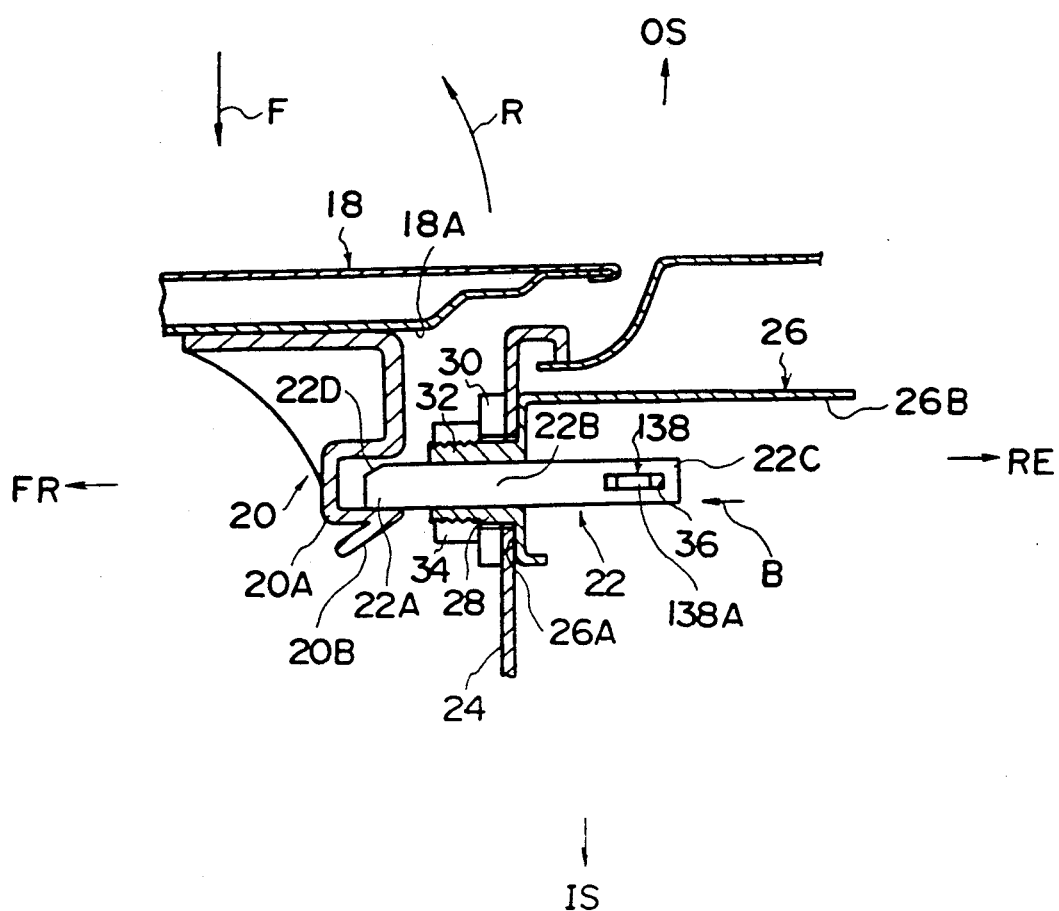
FIG. 7 is a fragmentary cross-sectional view taken along the line VII—VII of FIG. 6, and further illustrating a portion of the fuel lid.

As shown in FIGS. 6 and 7 the lid opening or operating means includes bellcrank 142, bell crank 138, and ratchet 152 connected to remote portion 50. Bell crank 138 has an end 138A inserted in a hole 36 provided adjacent the longitudinal rear end 22C of the shaft 22 of the lid locking means, from the lower side of the vehicle.

Accordingly, as the end 138A of the bell crank 138 moves in the longitudinal direction, the shaft 22 moves in the longitudinal direction, and the end 22A of the shaft 22 moves in and out of the recess defined by hook portion 20A of the lid retainer 20.

A central portion 138B of the bell crank 138 is pivotally supported by a supporting pin 140 which extends orthogonally from transverse wall 26B of the housing 26. Accordingly, the bell crank 138 is rotatable clockwise or counterclockwise as viewed in FIG. 6. The bell crank 138 is constantly urged counterclockwise as viewed in FIG. 6 by means of a torsion coil spring 141.

In addition, the other end of the bell crank 138 is bent orthogonally to extend transversely so as to constitute a pressing portion 138C. This pressing portion 138C is capable of being brought into contact with one end of on elongated pushbutton 145 of an actuation detecting switch 144 fixed to a bell crank 142.

A hook portion 138D projects transversely from a lower end of the central portion 138B of the bell crank 138, and this hook portion 138D engages a notch 143 formed on the inner side of a corner of a central bent portion 142B of bell crank 142. Bell crank 142 has a longitudinally extending front end 142A supported pivotally by a portion of the supporting pin 140 which is disposed transversely outwardly of the bell crank 138.

Since the hook portion 138D of the bell crank 138 is thus engaged with the notch 143 of the bell crank 142, when the bell crank 142 rotates about the supporting pin 140 clockwise as viewed in FIG. 6, the bell crank 138 also rotates about the supporting pin 140 clockwise as viewed in FIG. 6.

The actuation detecting switch 144 is fixed to the central bent portion 142B of the bell crank 142 in such a manner that the longitudinal direction of the pushbutton 145 is parallel with a tangent of a rotating path of the central bent portion 14B of the bell crank 142.

A flange 144C projects from front sruface 144B of a body 144A of the actuation detecting switch 144 in a direction perpendicular to the axis of the pushbutton 145. A circular hole 147 is provided in a central portion of the flange 144C. The actuation detecting switch 144 is fixed to the central portion 142B of the bell crank 142 and extends transversely from the inner side by means of a screw 146 inserted in the circular hole 147. In addition, with the switch 144 mounted a peripheral edge portion of the flange 144C abuts a transverse projecting ridge 142C projecting from the central bent portion 142B of the bell crank 142 toward the inner side, which prevents a positional deviation of the actuation detecting switch 144.

Accordingly, the actuation detecting switch 144 rotates clockwise or counterclockwise as viewed in FIG. 6 integrally with the bell crank 142.

The elongate pushbutton 145 of the actuation detecting switch 144 passes through the body 144A of the actuation detecting switch 144 along its axis. The pushbutton 14, when pressed by pressing portion 138C of the bell crank 138, moves in the direction of arrow OFF. When an upper end 145A of the pushbutton 145 is pressed and the pushbutton 145 is thereby moved in the direction of arrow OFF, the actuation detecting switch 144 is set in an open state. Meanwhile, even when the bell crank 138 rotates counterclockwise as viewed in FIG. 6 and its pressing portion 138C hence moves away from the pushbutton 145, the actuation detecting switch 144 is held in its open state.

A projection 27 is provided at a position where it is capable of abutting a lower end 145B of the pushbutton 145. The projection 27 projects horizontally from the transverse rear surface 26D of the housing 26 longitudinally rearwardly. Consequently, when the actuation detecting switch 144 rotates clockwise as viewed in FIG. 6, the pushbutton 145 is pressed by the projection 27 and moves in the direction of arrow ON, thereby setting the actuation detecting switch 144 in a closed state. This closed state is also maintained when the pushbutton 145 is separated from the projection 27.

This actuation detecting switch 144 is of a well known type which is ordinarily used in a power supply cord or the like, so an illustration of its internal structure will be omitted. A supporting pin 150 is provided on a lower end 142D of the bell crank 142 in such a manner as to project transversely inwardly. The lid opening means also includes a latch 152 which is pivotally supported on supporting pin 150 on the transversely inner side thereof. This latch 152 is constnatly urged clockwise as viewed in FIG. 6 by means of a torsion coil spring 151.

Figure 8:
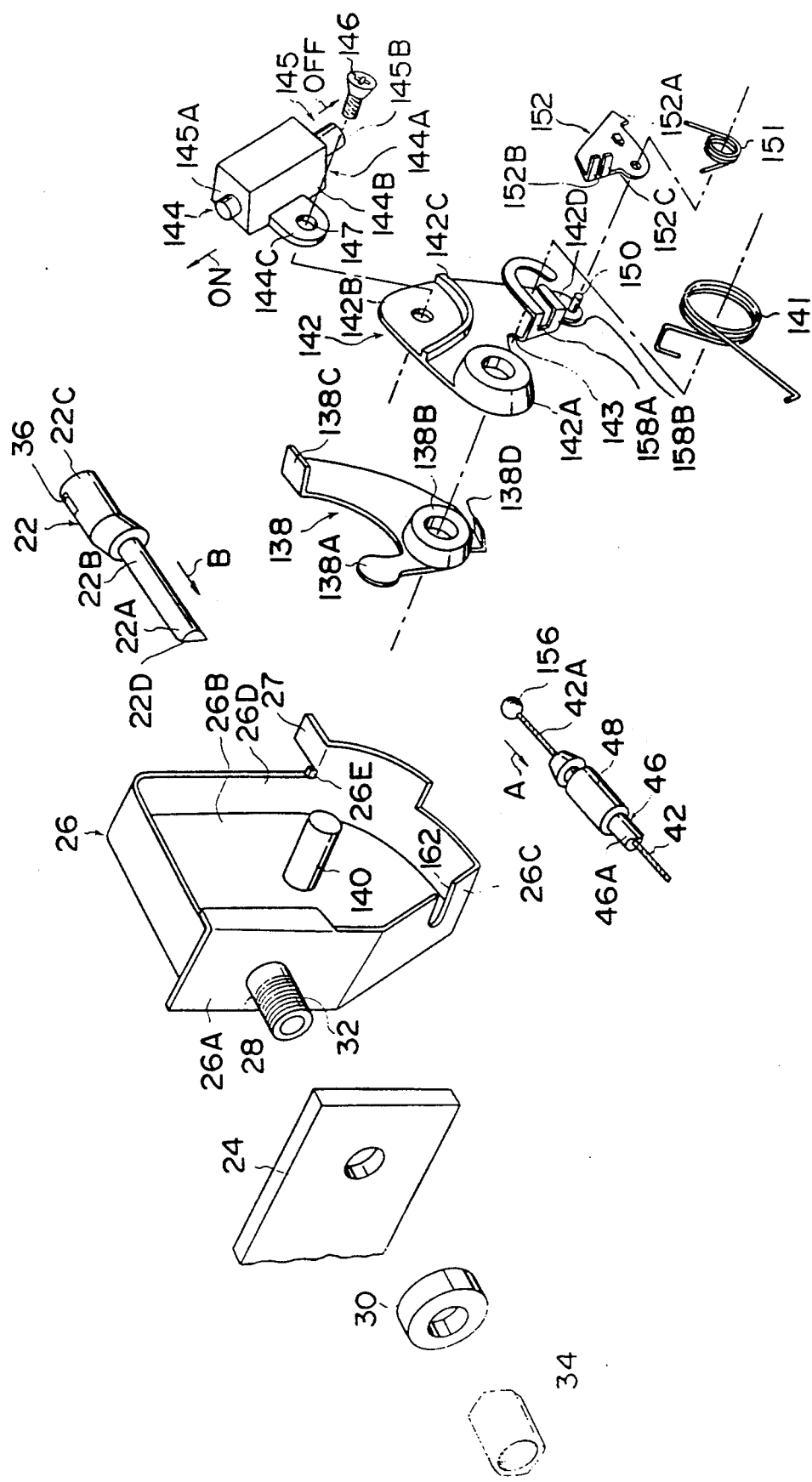
FIG. 8 is an exploded perspective view of the apparatus of FIG. 6 in accordance with the second embodiment.

A claw 152A see FIG. 8 is formed at a portion of the latch 152 located on the longitudinal rear and lower side thereof in such a manner as to project downwardly. The claw 152A is stopped by a projection 26E of the housing 26 by means of the urging force of the torsion coil spring 151. This projection 26E projects upwardly from a longitudinal front end of the projection 27. Accordingly, with the claw 152A of the latch 152 retained by the projection 26E, the bell crank 142 is prevented from rotating clockwise as viewed in FIG. 6.

A pair of parallel hooks 152B, 152C are provided uprightly on a portion of the latch 152 located on the longitudinal front and upper side thereof in such a manner as to project transversely toward the inner side of the vehicle. A ball 156 fixed to one end 42A of the wire 42 is retained between the hooks 152B and 152C on the longitudinal rear side thereof. The end 42A of the wire 42 is fixed by being passed between a pair of parallel hooks 158A and 158B of the bell crank 142. The hooks 158A, 158B are provided on a portion of the bell crank 142 on the upper side of the supporting pin 150 in such a manner as to project transversely toward the inner side of the vehicle. With the claw 152A of the latch 152 engaged at the projection 26E, as shown in FIG. 6, the hooks 152B, 152C of the latch 152 are spaced apart a predetermined distance from the bent portions of the hooks 158A, 158B.

Consequently, when the end 42A of the wire 42 has moved in the direction of arrow A (toward lower left in FIG. 6), the latch 152 rotates counterclockwise about the supporting pin 150 as viewed in FIG. 6, thereby causing the claw 152A to disengage the projection 26E. As a result, the bell crank 142 rotates about the supporting pin 140 clockwise as viewed in FIG. 6.

A transversely inner end of the hook 158A is bent orthogonally toward the transverse rear of the vehicle, and its distal end is curved downwardly in a J-shaped configuration. In addition, a transverse inner end of the hook 158B is also bent orthogonally toward the rear of the vehicle, and its distal end is located in the vicinity of a central portion of the J-shaped curvilinear hook 158A. Accordingly, the ball 156 fixed to the end 42A of the wire 42 is prevented from coming off easily from the hooks 158A, 158B.

In addition, the wire 42 is inserted in the wire tube 46, one end 46A of the wire tube 46 being secured to a notch 162 of the housing 26 via the tube stopper 48. The notch 162 is formed in the lower end 26C of the housing and has a U-shaped configuration with its opening facing inwardly of the vehicle.

As shown in FIG. 9, the other end 42B of the wire 42 is connected to the remote opener 50 provided in the vehicle compartment. This lid opener 50 is identical with the one described in connection with FIGS. 4 and 5.

In addition, the actuation detecting switch 144 is connected between a solenoid valve 170 and a battery 172 via an electrical wire 168 in series with a coil of the solenoid valve 170. This solenoid valve 170 is connected midway in the vent tube 69 connecting the fuel tank 10 and the canister 68 in the same way as the one shown in FIG. 3, and is adapted to put the vent tube 69 in a communicating state when the actuation detecting switch 144 is closed.

Figure 10:
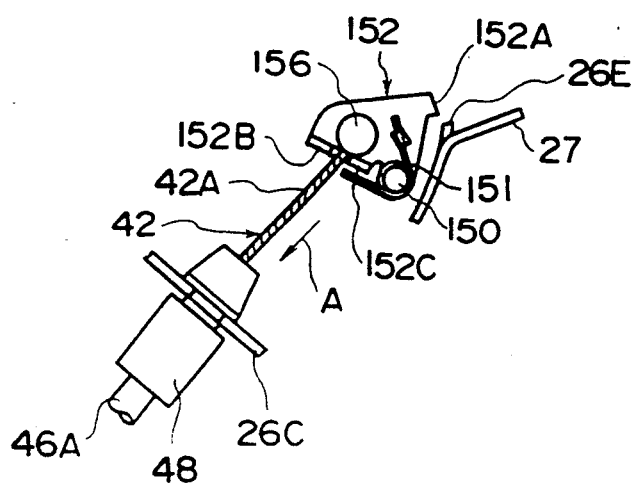
FIG. 10 is a fragmentary side elevational view illustrating an actuated state of the fuel lid opener and switch in accordance with the second embodiment.

The operation of this embodiment will be described hereinunder. It should be noted that the springs 141, 151 are omitted in FIGS. 11 and 12. When the occupant pulls up the handle 82 of the lid opener lever 52 shown in FIGS. 4 and 5 against the urging force of the tension coil spring 71 at the time of refueling, the end 42B of the wire 42 moves in the direction of arrow C in FIG. 5. Consequently, as shown in FIG. 10, the end 42A of the wire 42 moves in the direction of arrow A, with the result that the latch 152 rotates counterclockwise as viewed in FIG. 10 against the urging force of the spring 151, thereby allowing the claw 152A of the latch 152 to be released from the projection 26E. When the latch 152 rotates through a predetermined angle, the hooks 152B, 152C are brought into contact with the bent portions of the hooks 158A, 158B. Hence, as the end 42A of the wire 42 moves in the direction of arrow A, the bell crank 142 rotates clockwise as viewed in FIG. 11.

Figure 11:
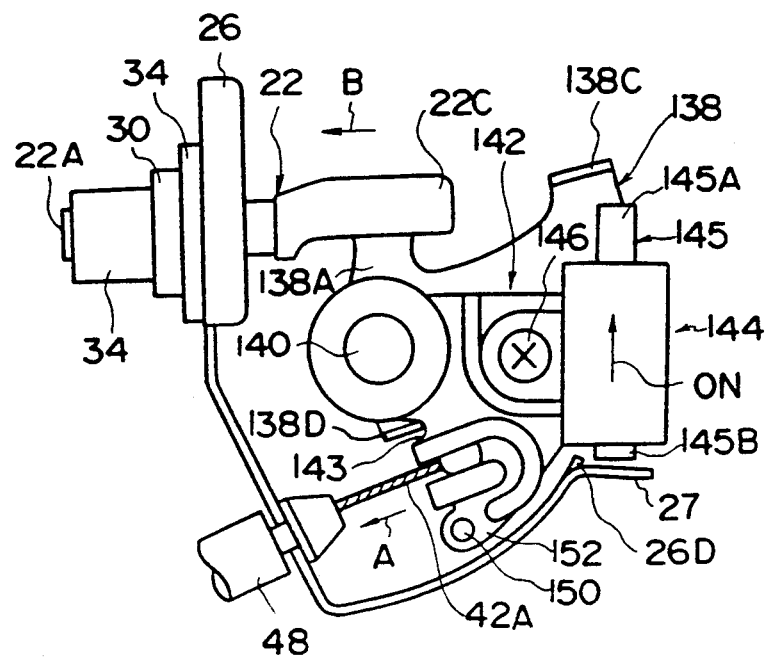
FIG. 11 and 12 are side elevational views respectively illustrating actuated states of the fuel lid opener and switch in accordance with the second embodiment.

In this case, since the hook portion 138D of the bell crank 138 is engaged with the notch 143 of the bell crank 142, the bell crank 138 rotates clockwise as viewed in FIG. 11 integrally with the bell crank 142. As a result, the shaft 22 moves in the opposite direction to that of arrow B, so that the end 22A of the shaft 22 is withdrawn from the recess defined by hook portion 20A of the retainer 20, thereby opening the fuel lid 18 in the direction of arrow R in FIG. 7.

In addition, when the end 42A of the wire 42 moves in the direction of arrow A, the bell crank 142 rotates clockwise as viewed in FIG. 11, and the actuation detecting witch 144 rotates clockwise as viewed in FIG. 11 integrally with the bell crank 142. Consequently, the end 145B of the pushbutton 145 of the actuation detecting switch 144 is brought into contact with the projection 27 of the shaft housing. As the bell crank 142 further rotates the pushbutton 145 moves in the direction of arrow ON, and the actuation detection switch is thereby closed, and the solenoid valve 170 is hence set in its open state. Consequently, the vent tube 69 for communication between the interior of the fuel tank 10 and the charcoal canister 68 is set in a communicating state, and the fuel vapor is adsorbed by the charcoal canister 68, thereby preventing the fuel vapor from being discharged to the atmosphere.

Subsequently, when the bell cranks 138, 142 have rotated counterclockwise as viewed in FIG. 11 by the urging force of the torsion coil spirng 141 and returned to their state shown in FIG. 6, the pushbutton 145 of the actuation detecting switch 144 remains operated in the direction of arrow ON, so that the actuation detection switch 144 is maintained in its closed state.

Figure 12:
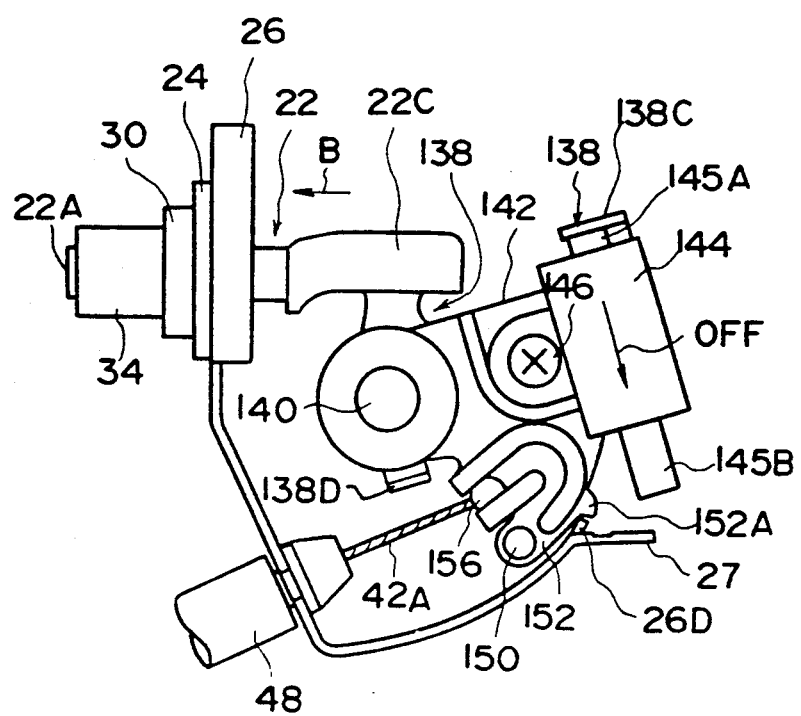
Figure 13:
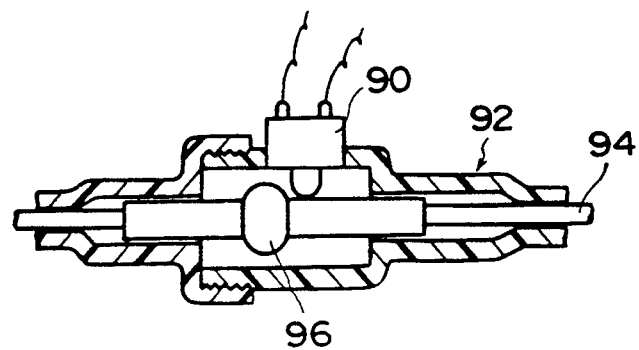
FIG. 13 is a side cross-sectional view of a conventional actuation detecting switch.

Meanwhile, when the operator has closed the fuel lid 18 after finishing the refueling, the shaft 22 is moved in the opposite direction to that of arrow B in response to this closing operation, as described above, so that the bell crank 138 rotates clockwise as viewed in FIG. 12. In this case, sicne the claw 152A of the ratchet 152 is engaged with the projection 36E of the housing 26, the bell crank 142 is prevented from rotating clockwise as viewed in FIG. 12.

Accordingly, the pressing portion 138C of the bell crank 138 is brought into contact with the end 145A of the pushbutton 145 of the actuation detecting switch 144. As a result, the pushbutton 145 moves in the direction of arrow OFF, and the actuation detecting switch 144 is opened, thereby setting the solenoid valve 170 in the closed state. For this reason, even when the vapor line is closed and fuel in the fuel tank is shaken due to vibrations during running, cornering, or the like, it is possible to prevent the efflux of fuel from the vent tube.

In addition, when the bell crank 138 has subsequently rotated counterclockwise as viewed in FIG. 12 by the urging force of the coil spring 141 and returned to its state shown in FIG. 6, the pushbutton 145 of the actuation detecting switch 144 remains operated in the direction of arrow OFF, so that the actuation detecting switch 144 is maintained in its open state.

As described above, the arrangement provided in the foregoing embodiment is such that the actuation detecting swtich 144 is opened and closed by the rotation of the bell cranks 138,142 provided at a connecting portion between the wire 42 and the shaft 22. Hence, it is possible to allow the actuation detecting switch 144 to perform the opening/closing operation positively in response to the opening and closing of the fuel lid 18.

By virtue of the above-described arrangements, the present invention offers an outstanding advantage in that the actuation detecting switch for controlling the opening and closing of the valve for placing the vent tube in a communicating state is capable of positively effecting an opening/closing operation in response to the opening and closing of the fuel lid.

It will be apparent to those skilled in the art that various modifications and variations can be made in the apparatus of the present invention without departing from the spirit or scope of the invention. Thus, it is intended that the present invention cover the modifications and variations of this invention provided they come within the scope of the present claims and their equivalents.

What is claimed is:

1. An apparatus for preventing discharge of fuel vapor from a fuel tank mounted within a vehicle, the fuel tank having a fuel inlet aligned with an exterior opening in the vehicle and a cap for opening and closing the fuel tank inlet, comprising:

adsorbing means mounted to the vehicle for adsorbing fuel vapor from said fuel tank;

communicating means connecting said adsorbing means and said fuel tank for transferring the fuel vapor from said fuel tank to said adsorbing means when in an open position and for isolating the adsorbing means from the fuel tank when in a closed position;

a fuel lid pivotably mounted to the vehicle adjacent the vehicle exterior opening and being movable between an open and closed position for uncovering and covering the exterior opening in the vehicle;

lid locking means mounted to the vehicle and said fuel lid moving between a locking position for holding said fuel lid in a closed position and an unlocking position for releasing said fuel lid to the open position;

switching means disposed adjacent an end of said lid locking means responsive to the movement of said lid locking means between said locking position and said unlocking position for controlling said communicating means between the open and closed position;

closing means operably connected to said communicating means electrically controlled by said switching means for closing said communicating means when said lid locking means is in said locking position; and lid opening means movably attached to said lid locking means and including a control mechanism remotely disposed in the vehicle from the lid locking means for remotely opening said lid locking means in interlocking relation with the operation of said switching means.

2. An apparatus according to claim 1, wherein said switching means includes a pushbutton switch operated by the movement of said lid locking means from said locking position to said unlocking position, and reset by the movement of said lid locking means between said unlocking position and said locking position.

3. An apparatus according to claim 1 wherein said lid locking means includes supporting means having a shaft portion reciprocably mounted to said fuel lid, said supporting means fixedly supporting said switching means for operation upon movement of said lid locking means.

4. An apparatus according to claim 3, wherein said supporting means comprises a cylindrical member for slidably supporting said shaft portion of said lid locking means, and a mounting portion for fixedly mounting said cylindrical member and said switching means on said supporting means.

5. An apparatus according to claim 3, wherein said lid opening means comprises a first lever disposed in a vehicle compartment, and a second lever pivotally mounted, at an intermediate portion, on said supporting means in the vicinity of said lid locking means, a first connecting end and a second connecting end, said first connecting end of said second lever being connected to said first lever by a wire, and said second end of said second lever being operably connected to said lid locking means for reciprocatively moving said lid locking means.

6. An apparatus according to claim 5, further comprising urging means for urging said second lever in a predetermined direction for moving said lid locking means toward said locking position.

* * * * *

UNITED STATES PATENT AND TRADEMARK OFFICE
CERTIFICATE OF CORRECTION

PATENT NO. : 5,080,421

DATED : January 14, 1992

INVENTOR(S) : HIDEKAZU OTOWA ET AL.

It is certified that error appears in the above-identified patent and that said Letters Patent is hereby corrected as shown below:

Claim 1, column 12, line 51, change "moving" to --movable--.

Signed and Sealed this

Eighth Day of June, 1993

Attest:

MICHAEL K. KIRK

Attesting Officer

Acting Commissioner of Patents and Trademarks